H. M. NORRIS.
FRICTION CLUTCH.
APPLICATION FILED AUG. 17, 1910.
1,030,424.
Patented June 25, 1912.
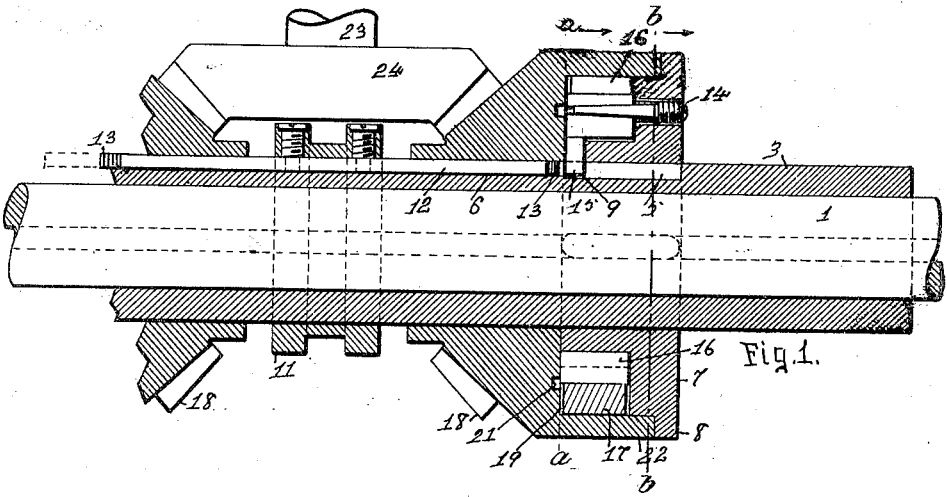
Fig. 1.
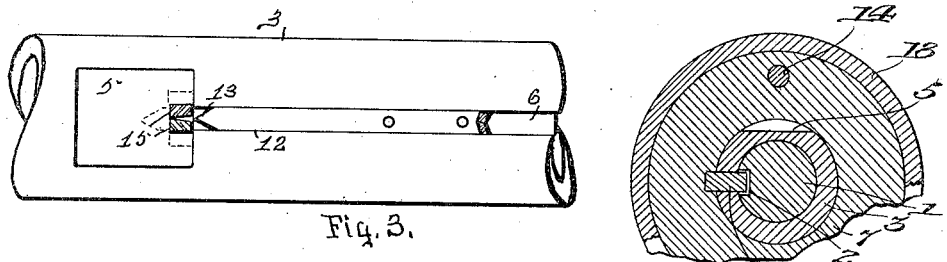
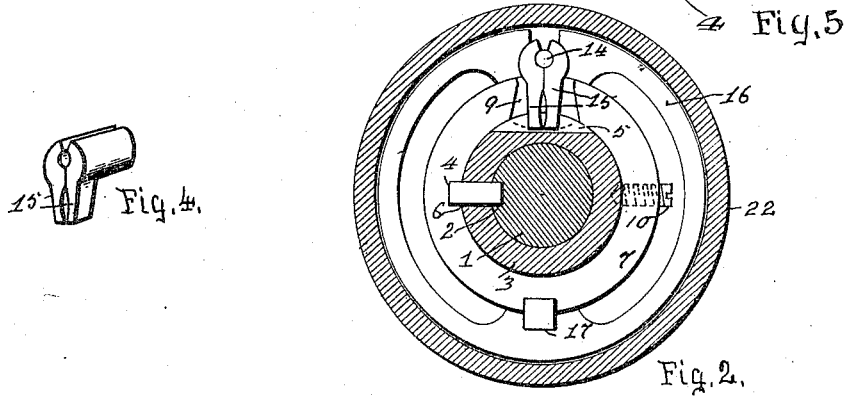
Henry M. Norris, Inventor
Witnesses
W. Thornton Bogert
Samuel Carr.
By Robert S. Carr.
Attorney

UNITED STATES PATENT OFFICE.

HENRY M. NORRIS, OF CINCINNATI, OHIO, ASSIGNOR TO THE CINCINNATI BICKFORD TOOL COMPANY, OF CINCINNATI, OHIO, A CORPORATION OF OHIO.

FRICTION-CLUTCH.

1,030,424.	Specification of Letters Patent.	Patented June 25, 1912.

Application filed August 17, 1910. Serial No. 577,615.

*To all whom it may concern:*

Be it known that I, HENRY M. NORRIS, a citizen of the United States, residing at Cincinnati, Ohio, have invented a new and useful Improvement in Friction-Clutches, of which the following is a specification.

My invention relates to friction clutches of the class adapted to be used for driving or reversing the spindle of radial drills or for other suitable purposes and the objects of my improvements are to provide an adjustable fulcrum for the cam levers to compensate for the wear of the friction ring; to provide means for controlling the expansion of the friction ring to a predetermined amount for preventing excessive strain or wear thereon; to provide a perfectly balanced clutch adapted for high speeds, and to provide simple and durable construction and assemblage of the various members for securing facility of operation and efficiency of action. These objects are attained in the following described manner as illustrated in the accompanying drawings, in which:—

Figure 1 is a longitudinal section of a friction clutch embodying my improvements; Fig. 2 a transverse section on the line a—a of Fig. 1; Fig. 3 a plan of the sleeve with the actuating plunger therein for the cam levers, Fig. 4 a perspective view of said levers, and Fig. 5 a transverse section on the line b—b of Fig. 1, with parts broken away.

In the drawings, 1 represents a driving shaft formed with a longitudinal groove 2, 3 a sleeve splined thereon by means of key 4 secured therein and slidably engaging at one end with said groove. Said sleeve is formed with a transverse notch 5 and with a longitudinal groove 6 terminating at its end therein. A stepped collar 7 formed with a peripheral flange 8 and with a gap 9 in registration with the notch 5 is secured in rotative engagement with sleeve 3 by means of the engagement of the other end of key 4 therewith and prevented from longitudinal movement by means of a set screw 10. A grooved collar 11 longitudinally movable on sleeve 3 by means of a hand lever not shown is secured to a plunger 12 which is thereby movable within groove 6. Said plunger is formed with parallel edges which terminate with a short taper in a point 13.

A taper pin 14 adjustably threaded in the stepped collar 7 serves as an adjustable fulcrum for twin cam levers 15 which movably engage near one end therewith and are extended through gap 9 and terminate at the other end within notches 5 as shown in Fig. 2, and with their adjacent edges in registration with the opposite sides of the point of plunger 12.

A split contractile friction ring 16 secured on the collar 7 by means of a key 17 terminates in movable clamping engagement with the twin cam levers 15, as shown in Fig. 2. A bevel gear 18 formed in its rear end with a counter bore 19 and with a circular groove 21 in registration with the taper pins 14 is mounted idly on sleeve 3 with said counter bore loosely inclosing the friction ring 3 and with the annular wall 22 thereof in movable engagement with the peripheral flange of collar 7 as shown in Fig. 1. A driven shaft 23 journaled in bearings not shown is provided with a pinion 24 in continuous engagement with gears 18.

In operation, by means of the sliding collar, the plunger may be moved alternately in opposite directions with its taper point between and beyond the corresponding twin cam levers for actuating said levers to expand the friction ring into frictional engagement with the inside of wall 22 for turning the gear 18 with the gear 24 for driving shaft 23. The adjustment of the taper pin longitudinally serves to cause the cam levers to take up any wear on the friction ring that its frictional engagement with the wall of the counter bore may be maintained constant during the contact of said levers with the parallel edges of the plunger regardless of the further movement thereof.

The clutch described may be duplicated at the other side of gear 24 if desired for driving the shaft 23 in a reverse direction. The longitudinal adjustment of the sleeve 3 on shaft 1 permits shaft 23 to be adjusted to different positions thereon for adapting it to drive the spindle in different adjusted positions on the arm of a radial drill.

Having fully described my improvements what I claim as my invention and desire to secure by Letters Patent of the United States is:—

1. In a friction clutch the combination with a shaft formed with a spline groove, a sleeve slidable thereon and formed with a radial slot, a stepped collar encircling the sleeve and formed with a key seat, a key secured at one end in the key seat and terminating at the other end through the slot in the sleeve and in slidable engagement with the spline groove, of a flanged idle member on the sleeve concentric with the collar, a contractile friction ring secured to said collar, and lever mechanism for expanding said ring into frictional engagement with the idle member.

2. In a friction clutch the combination of a shaft, a sleeve splined thereon, a collar secured on the sleeve, a contractile ring secured on the collar, an idle member on the sleeve concentric with the collar, twin levers carried by the collar and engaging with the ring, and a movable wedge for simultaneously actuating the levers with the ring into frictional engagement with the idle member.

3. In a friction clutch the combination of a shaft, a sleeve splined thereon and formed with a longitudinal groove, a collar secured on the sleeve, a contractile split ring secured thereon, twin levers carried by the collar engaging with the respective ends of the ring, a member mounted to turn on the sleeve concentric with the collar, and a tapered key movable within the groove in the sleeve for actuating the levers simultaneously to expand the ring into frictional engagement with the idle member.

H. M. NORRIS.

Witnesses:
R. S. CARR,
V. T. BLAIR.